US006976040B2

(12) United States Patent
Shin et al.

(10) Patent No.: US 6,976,040 B2
(45) Date of Patent: Dec. 13, 2005

(54) SYSTEM AND METHOD OF DATA-MANAGEMENT AND DATA-MANAGEMENT PROGRAM

(75) Inventors: Hiromasa Shin, Tokyo (JP); Mutsumi Fujihara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 356 days.

(21) Appl. No.: 10/105,419

(22) Filed: Mar. 26, 2002

(65) Prior Publication Data

US 2002/0143740 A1 Oct. 3, 2002

(30) Foreign Application Priority Data

Mar. 29, 2001 (JP) ........................................ 2001-097581

(51) Int. Cl.[7] .............................................. G06F 17/00
(52) U.S. Cl. .................... 707/204; 707/102; 707/104.1; 707/100
(58) Field of Search ................................ 707/204, 206, 707/104.1, 100; 711/162, 161

(56) References Cited

U.S. PATENT DOCUMENTS

| | | | |
|---|---|---|---|
| 6,012,059 A | 1/2000 | Neimat et al. | |
| 6,182,198 B1 * | 1/2001 | Hubis et al. | 711/162 |
| 6,460,054 B1 * | 10/2002 | Grummon | 707/204 |

OTHER PUBLICATIONS

"Replication Server, Administration Guide", Replication Server Technical Publications, Replication Server Release 11.0.x, Document ID: 32511–01–1100–02, XP–002285320, Nov. 1, 1996, pp. (1–1)–(1–16), (2–1)–(2–34), (5–3), (6–3)–(6–5), (7–19)–(7–20), and (13–18).

Ming–Yee Lai, et al., "Broadcast Database Systems", Proceedings of the International Conference Systems, vol. CONF. 7, XP–000011490, Sep. 21–25, 1987, pp. 408–415.

Erhard Rahm, "Design Optimistic Methods for Concurrency Control in Database Sharing Systems", Proceedings of the International Conference Systems, vol. CONF. 7, XP–000011459, Sep. 21–25, 1987, pp. 154–161.

Alexey Vaysburd, "Fault Tolerance in Three–Tier Applications: Focusing on the Database Tier", Proceedings of the 18th IEEE Symposium on Reliable Distributed Systems, XP–010357037, Oct. 19, 1999, pp. 322–327.

* cited by examiner

*Primary Examiner*—Alford Kindred
*Assistant Examiner*—Sana Al-Hashemi
(74) *Attorney, Agent, or Firm*—Oblon, Spivak, McClelland, Maier & Neustadt, P.C.

(57) ABSTRACT

A data-management system manages identical data stored in main-memory areas of several computers connected via a network. The system has a transaction acceptor to accept a request for executing a transaction of accessing the database, a transaction executor to execute the transaction, a replication processor to process the replica data to reflect updated data sent from the original site and a data receiver and a data transmitter. An updating transaction for the data of the database is performed by the transaction executor but allowed only for the original site. The updated data is transmitted from the data transmitter of the original site and received by the data receiver of the replica site and reflected on the replica data of the replica site by the replication processing section.

26 Claims, 14 Drawing Sheets

TRANSACTION-REGISTRATION TABLE

| LEXICON SET | TRANSACTION | LOOK-UP /UPDATE | ORG SITE | TR FUNCTION |
|---|---|---|---|---|
| LEXSET-A | tr-1 | LOOK-UP | CITE- A | TRFUNC-1 |
| LEXSET-A | tr-2 | UPDATE | CITE- A | TRFUNC-2 |
| LEXSET-B | tr-3 | LOOK-UP | CITE-B | TRFUNC-3 |
| LEXSET-B | tr-3 | UPDATE | CITE- B | TRFUNC-4 |

FIG. 5

TRANSCRIPTION-WAITIN TR TABLE

| RECEPTION ID | TRANSACTION |
|---|---|
| ID - 1 | TRANSACTION-1 |
| ID - 2 | TRANSACTION-2 |

FIG. 6

LEXICON-SET STATUS TABLE

| ID NO. | RUNNING STATUS | UPDATED NO. |
|---|---|---|
| LSID-1 | READY | #128 |
| LSID-2 | RETRIEVING | #109 |
| LSID-3 | READY | #304 |

SYSTEM AND METHOD OF DATA-MANAGEMENT AND DATA-MANAGEMENT PROGRAM

CROSS REFERENCE TO RELATED APPLICATIONS

This application claims benefit of priority under 35USC §119 to Japanese Patent Application No. 2001-97581 filed on Mar. 29, 2001 in Japan, the entire contents of which are incorporated by reference herein.

BACKGROUND OF THE INVENTION

The present invention relates to a data-management system and a data-management method for adequately and efficiently managing data shared by several machines connected to a network.

Database systems for real-time monitoring and controlling of data shared by computers distributed over a network have to process (search and update) a huge amount of data at a high speed. Such database performance thus depends on data-management systems that provide a means of accessing those data. Enhanced data-management systems could manage all data on a main-memory area, which are usually stored on an external storage device such as a hard disk. Increased storage capacity for main memories has allowed all data to remain in a main-memory area as resident data even in the present hardware environments.

Mere caching of a data-managing system on a main-memory area to known external storage devices cannot achieve high performance for real-time applications. There are two reasons for such a drawback: (1) a huge amount of data has to be transferred between an application and a data-managing system; and (2) execution of algorithms designed for disc storage devices on a main-memory area of each computer cannot achieve high performance. In addition, limited functions of such algorithms designed for disc storage devices and provided by a data-managing system cannot lighten loads for development of applications, nonetheless achieving high-speed processing a little bit.

Moreover, known data management systems have drawbacks discussed below.

The known systems employ a client/server architecture in which one server holds and manages original data due to difficulty in management of the identical data shared by several machines distributed in a network. The server at which original data is resident however takes a heavy burden in which it has to respond to requests from several machines, thus causing a low processing efficiency.

In the known systems, every machine accesses the server that holds and manages original data even in transaction procedures for data looking-up with no updating. This causes decrease in access speed by the time of going through a network and also low transaction processing efficiency due to a heavy network traffic.

An application program running at each machine in the known system has to check at which server original data is resident, thus the application program cannot access necessary data immediately.

The known systems have to suspend procedures requested by several machines to access data while an application program running at one particular machine is applying an updating procedure to the same data, thus causing low throughput for transaction processing.

SUMMARY OF THE INVENTION

In order to solve the problems discussed above, a purpose of the present invention is to provide a distributed data-management system and a distributed data-management method, in which several machines in a network co-operate to manage data so that identical data may always be resident at main-memory areas over the several machines.

A data-management system according to an embodiment of the present invention including at least two computers connected via a network, the computers having main-memory areas storing databases, each database having at least a piece of data, either of the computers being designated as an original site for storing the original of the data, the other computer being designated as a replica site for storing replica of the data, each computer having: a transaction acceptor configured to accept a request for executing a transaction of accessing the database; a transaction executor configured to execute the transaction; a replication processor configured to process the replica data to reflect updated data sent from the original site; and a data receiver and a data transmitter, wherein an updating transaction for the data of the database is performed by the transaction executor but allowed only for the original site, and the updated data is transmitted from the data transmitter of the original site and received by the data receiver of the replica site and reflected on the replica data of the replica site by the replication processing section.

A data-management method according to an embodiment of the present invention for managing databases provided for at least two computers connected via a network, the computers having main-memory areas storing databases, each database having at least a piece of data, the method including: designating either of the computers as an original site for storing the original of the data; designating the other computer as a replica site for storing replica of the data; performing a transaction of accessing the database at each computer; determining which one of the computers is the original site, the determining being performed by each computer; updating the data of the database at the original site, the updating being allowed only for the original site; and reflecting the data thus updated at the original site on the replica data of the replica site to maintain data equivalence over the databases.

A computer readable medium according to an embodiment of the present invention containing a data-management program for managing databases provided for at least two computers connected via a network, the computers having main-memory areas storing databases, each database having at least a piece of data, the program having instructions for: designating either of the computers as an original site for storing the original of the data; designating the other computer as a replica site for storing replica of the data; performing a transaction of accessing the database at each computer; determining which one of the computers is the original site, the determining being performed by each computer; updating the data of the database at the original site, the updating being allowed only for the original site; and reflecting the data thus updated at the original site on the replica data of the replica site to maintain data equivalence over the databases.

A computer readable medium according to an embodiment of the present invention containing a data-management program for managing data for at least two computers connected via a network for data management, the computers having main-memory areas storing databases, each database having at least a piece of data, either of the computers being designated as an original site for storing the original of the data, the other computer being designated as a replica site for storing replica of the data, information on data updating performed at the original site being reflected on the replica site to maintain data equivalence over the computers, the program having instructions for: determining which of the computers is the original site for storing the original of the data and whether a transaction for the data is a looking-up transaction or an updating transaction; performing the updating transaction when it is determined that the computer for performing the transaction is the original site and the transaction for the data is the updating transaction; and transmitting information on the updating transaction to the replica site.

A computer readable medium according to an embodiment of the present invention containing a data-management program for managing data for at least two computers connected via a network for data management, the computers having main-memory areas storing databases, each database having at least a piece of data, either of the computers being designated as an original site for storing the original of the data, the other computer being designated as a replica site for storing replica of the data, information on data updating performed at the original site being reflected on the replica site to maintain data equivalence over the computers, the program having instructions for: determining which of the computers is the original site for storing the original of the data and whether a transaction for the data is a looking-up transaction or an updating transaction; transmitting the updating transaction to the original site when it is determined that the computer for performing the transaction is the replica site and the transaction for the data is the updating transaction; and receiving information on the updating transaction performed at the original site and reflecting the information on the replica data at the replica site.

BRIEF DESCRIPTION OF DRAWINGS

FIG. 5 shows an example of a transaction-registration table;

FIG. 6 shows an example of a "transcription"-waiting TR table;

DETAILED DESCRIPTION OF EMBODIMENTS

Embodiments according to the present invention will be disclosed with reference to the attached drawings.

[1. Overall Picture of Distributed Data-Management System]

The present invention relates a distributed data-management system for adequately and efficiently managing databases provided on several machines connected via a network.

A distributed data-management system (called the present system hereinafter) according to the present invention is explained briefly before the detail disclosure.

The present system handles databases (lexicon sets) and transactions. In detail, the present system receives requests for operations such as database looking-up and updating as transactions from applications (users) and executes the transactions with no faults, and also sends notifications of execution completed and results of execution to the applications.

Figure 1:
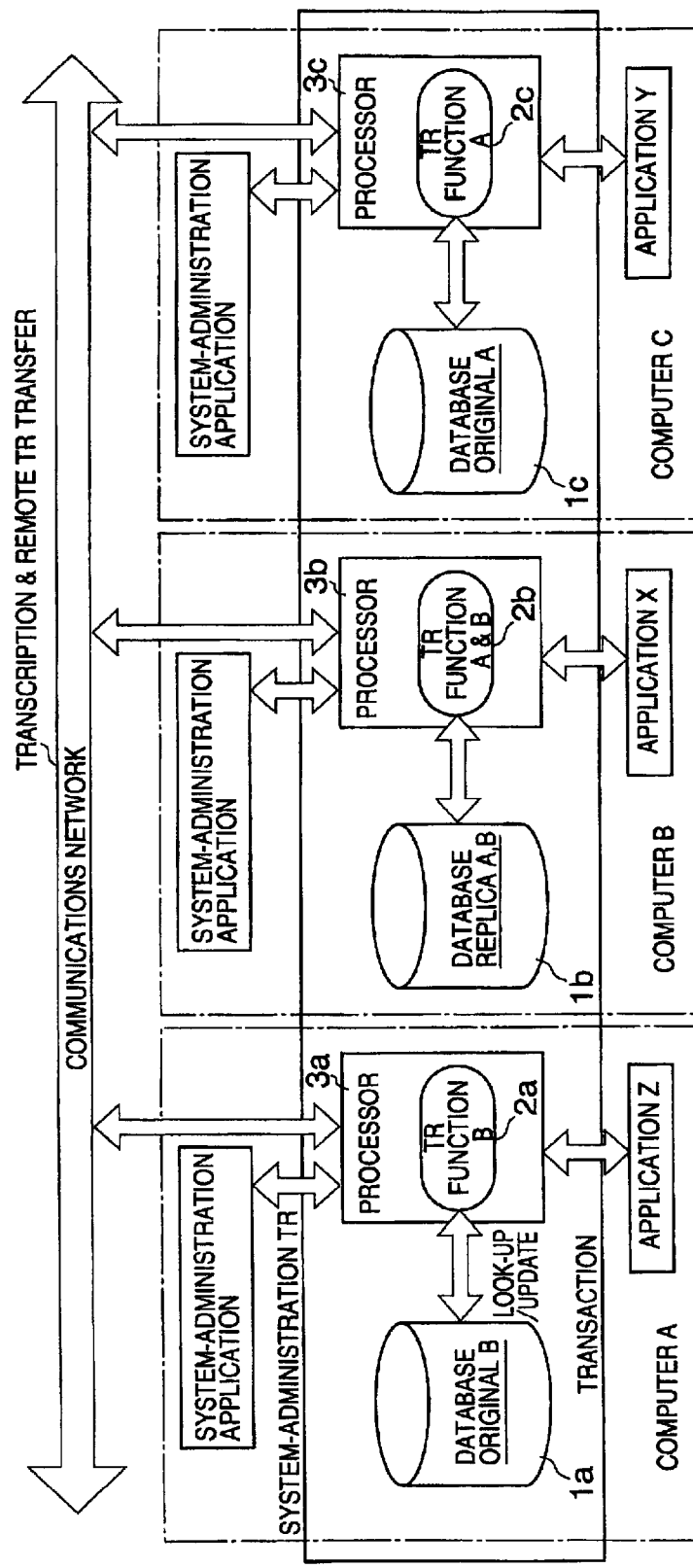
FIG. 1 shows the overall architecture of a distributed database-management system according to an embodiment of the present invention.

FIG. 1 shows the architecture of a distributed-processing database-management system according to the present invention.

The present system includes several computers A, B, C, . . . (each being called a host), as shown in FIG. 1, connected via a communications network. Provided in main-memory areas of the hosts A, B and C are databases 1a, 1b and 1c, respectively, and also transaction (TR) functions 2a, 2b and 2c, respectively, used for accessing the corresponding databases.

One or more of applications will run on each host. Therefore, different applications will mostly run on hosts when the present system includes several hosts. In detail, each of applications X, Y and Z provided outside the present system accesses the database of the corresponding host for necessary processing. More precisely, each of the applications X, Y and Z makes requests for procedures such as looking-up and updating to the corresponding transaction function 2a, 2b or 2c pre-registered in the present system via the corresponding processor 3a, 3b or 3c. On receiving the processing results, each application performs a necessary procedure for execution of programs in addition to accessing the corresponding database. Usually, the applications X, Y and Z perform front-end procedure such as displaying on monitor screen and printing.

(Database)

Figure 2:
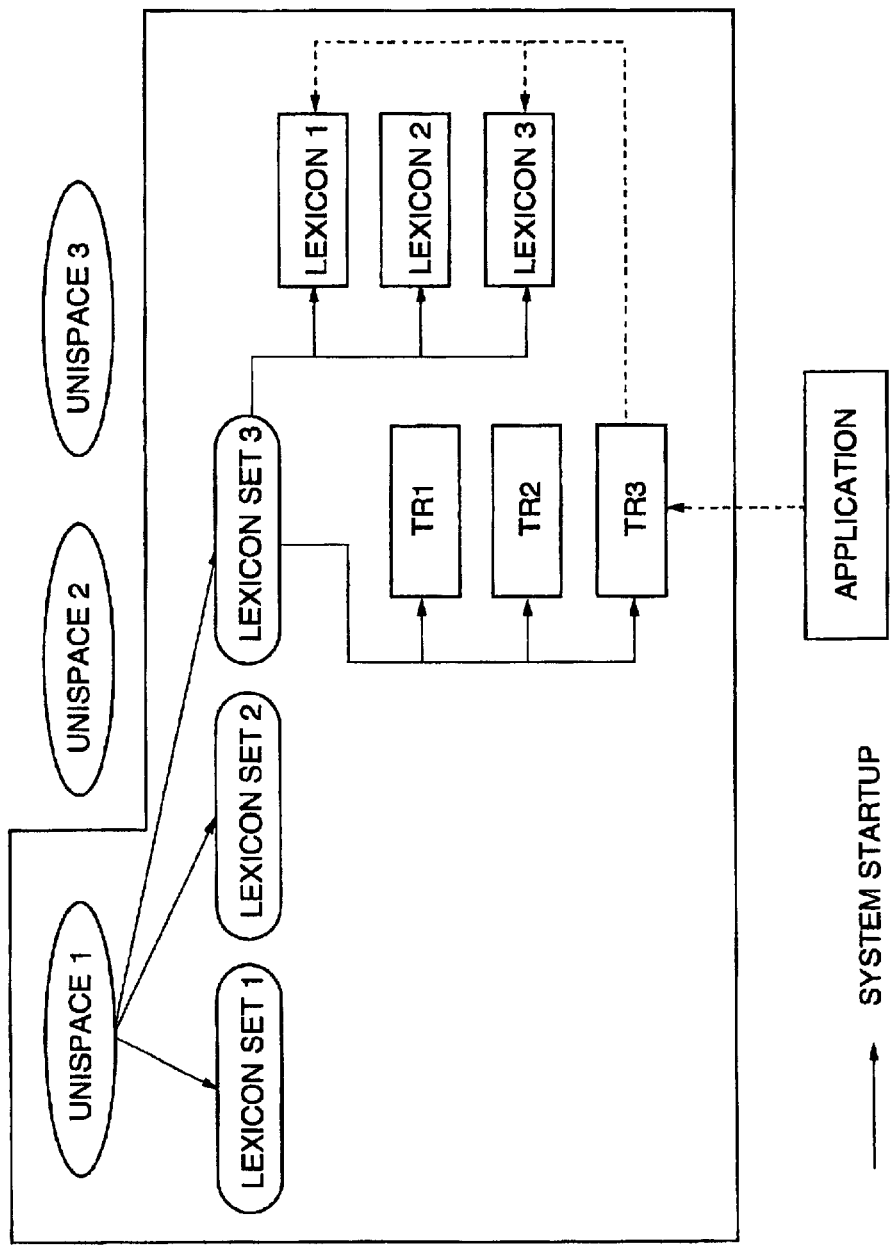
FIG. 2 illustrates a uni-space structure.

Each of the databases 1a, 1b and 1c in the present system includes one or more of lexicons. A lexicon is a unit for selective accessing data in a lexicon set or giving attributes to the data. Lexicons are discriminated from each other by their (lexicon) names. Lexicon sets are also discriminated from each other by their (lexicon-set) names because a uni-space can contain several lexicon sets, as illustrated in FIG. 2, in the environment for executing the present system. Several uni-spaces are also discriminated from each other by their (uni-space) names because the present system can be structured as several systems for managing several uni-spaces, or several different lexicon sets, via a common network on a physical machine.

The original data of a lexicon set stored in the database of one of the hosts has been stored at another host, and its replica data has been stored at still another host. For example, in FIG. 1, the original data for data B has been stored at the host A (computer A), and that for data A has been stored at the host C (computer C). The replica data for the data A and B have been stored at the host B (computer B). The data-updating procedure can be allowed to the original data only, not to the replica data in the present system.

(Transaction)

A unit of procedures for data looking-up and updating executed in response to one request from an application is called a transaction. A transaction corresponds to a "transaction function" in which detailed procedures are stated. Transaction functions (TR functions) A and B shown in FIG. 1 are used to access the database of the corresponding machine for realization of a necessary procedure shared by the applications X, Y and Z. In other words, the applications X, Y and Z do not directly access the corresponding databases but via the corresponding transaction functions in the present system.

A transaction includes identifiers (such as a transaction name) for giving data several types of attributes. A transaction function to be executed may be set so that it corresponds to the identifiers. A necessary number of identifiers can be prepared in accordance with the types of attributes to be given.

A transaction can handle only one lexicon set in the present invention. A uni-space can include several lexicon sets, so that a lexicon-set name to be operated is stated in a transaction. The lexicon-set name may be one of the identifiers. Statement of a lexicon-set name in a transaction is not a must because a lexicon set to be operated can be found by using another identifier.

The present system processes a data-operation request from an application per transaction. The updating procedure to the original data is also executed per updating TR. Moreover, a necessary procedure to the replica data is executed at a replica site per original updating TR so that the replica data can reflect changes in the original data due to the updating procedure with the function called "transcription", which will be explained later.

(Major Purpose of the Present System)

The major purpose of the present system is to maintain databases (lexicon sets) as containing identical contents over several machines. In detail, several machines hold duplicates of a database, and when a database at one machine has been updated, the updated information (the contents of updating) is transmitted to other machines via a communications network so that the databases at the other machines can reflect the updating, to fulfill the purpose. This function is called "transcription" in the present invention. Data transmitted by the function "transcription" is called "transcribed" data in the present invention.

A machine that is authorized to update a database is called an original site for the database and data in the database is called an original data in the present invention. Other machines that hold duplicates of that database are called replica sites and data in each duplicate of the database is called replica data in the present invention.

The present system executes a transaction (updating TR) for updating a database at the original site. With the function "transcription", the system further handles several duplicate databases as logically seen as one database from the application of each machine. The application of each machine therefore does not need to know about which machine is the original site. This system architecture is called "remote/local architecture" in the present invention.

In the present system, until a unit of execution of a transaction and a necessary procedure to replica data so that it can reflect changes in "transcribed" data has been completed for a database (lexicon set), another transaction procedure (and also a procedure on another "transcribed" data) for the database will not be executed at each host. In other words, another transaction procedure and a procedure on another "transcribed" data have to wait for the completion of all the execution described above.

In other words, a transaction procedure and a procedure on "transcribed" data for one database (lexicon set) of one machine are serially executed per transaction. Therefore, an application that has requested a transaction will not access a database to which another transaction is running.

A transaction for data searching and looking-up only with no updating procedure is called a looking-up transaction in relation to an updating transaction. The function "transcription" in the present system achieves quick matching between original data and replica data per transaction. This allows a look-up transaction to handle the replica data of a machine (local machine) that has received the request for the transaction.

The communications network in the present system is a means of achieving the function "transcription" in which an original site transmits "transcribed" data to replica sites. It is also a means of transmitting an updating transaction issued (requested) at a replica site to the original site. The function of executing the updating transaction at an original site is achieved by transmitting the updating transaction issued at a replica site to the original site via the communications network.

[Definition of Technical Terms]

Meaning of several technical terms used in this specification will be explained before disclosure of the embodiments.

A "uni-space" is defined as involving several databases (lexicon sets) to be handled by the present system, as shown in FIG. 2. A uni-space acts as an identifier for identifying each data and data-access service (looking up and updating). A uni-space name is thus given to each uni-space.

A lexicon is a subset defined for data being shared by several machines (called common data hereinafter) and constituting each uni-space. It is possible to decide whether or not to provide machines with the common data per lexicon set. Several types of procedures are performed per lexicon set in the present system.

A transaction is an operation of looking-up or updating common data in response to a request from an application program. A set of data operated by a transaction at once is one lexicon set only.

Local site: self-site when looked from an application;

Remote site: other sites when looked from an application;

Original site: a site holding original data; and

Replica site: sites holding replica (duplicate) data.

Local Looking-Up: This transaction operation to is allowed only to look up common data, executed as accessing to completely local main-memory data, with no network traffic.

Local Updating: This is an updating function for an original site at which an application has issued a transaction. This function allows the original site to update data, and then to multicast the updated data to other sites so that several hosts can always use the identical data.

Remote Updating: This is an updating function for each replica site at which an application has issued a transaction. This function does not allow the replica site to update data because it is a replica data. The transaction is transmitted to an original site for data updating. "Transcribed" data is transmitted by the function "transcription" so that several hosts can always use the identical data. Replica sites with no such application that has issued this transaction can receive "transcribed" data from the original site. This allows several hosts to always use the identical data.

"Transcription" is a function of transmitting data updated by updating transaction to other machines from a specific machine by multicasting.

"Retriever" is a function for a self-site to take lexicon-set data from another running machine so that the self-site can handle the lexicon-set data at the self-site.

[3. Embodiments and Computer]

The embodiments of the present invention are achieved on a computer. Several functions in the embodiments and modifications are performed by specific procedures (programs) that run on the computer.

Each "means" disclosed in this specification is a conception of the corresponding function in the embodiments and the modifications.

Each "means" thus does not necessarily have one-to-one correspondence with a specific hardware or a software routine.

In detail, one hardware element acts as several means on different occasions. For example, a computer acts as a means for executing a command and acts as another means for executing another command. One means may be achieved by one command or several commands on different occasions.

The embodiments and the modifications will be disclosed with imaginary circuit blocks (means) representing several functions.

Several steps in each procedure in the present invention can be executed in different step order, simultaneously or indifferent step order per execution. The order of steps can be changed by a menu-type interfacing technique in which a user selects an executable procedure.

[4. First Embodiment]

The first embodiment employs "transcription" a unique function for the distributed data-management system. The function "transcription" is to transmit data updated by an updating transaction to other machines from a specific machine by multicasting. In detail, an original site executes the updating transaction and transmits only updated data to replica sites by multicasting. The replica sites receive the updated data so that replica data resident at each replica site can reflect the changes in the transmitted data due to the updating. This function achieves that the identical data are always resident at all machines in a network.

[4-1. Architecture in First Embodiment]

Figure 3:
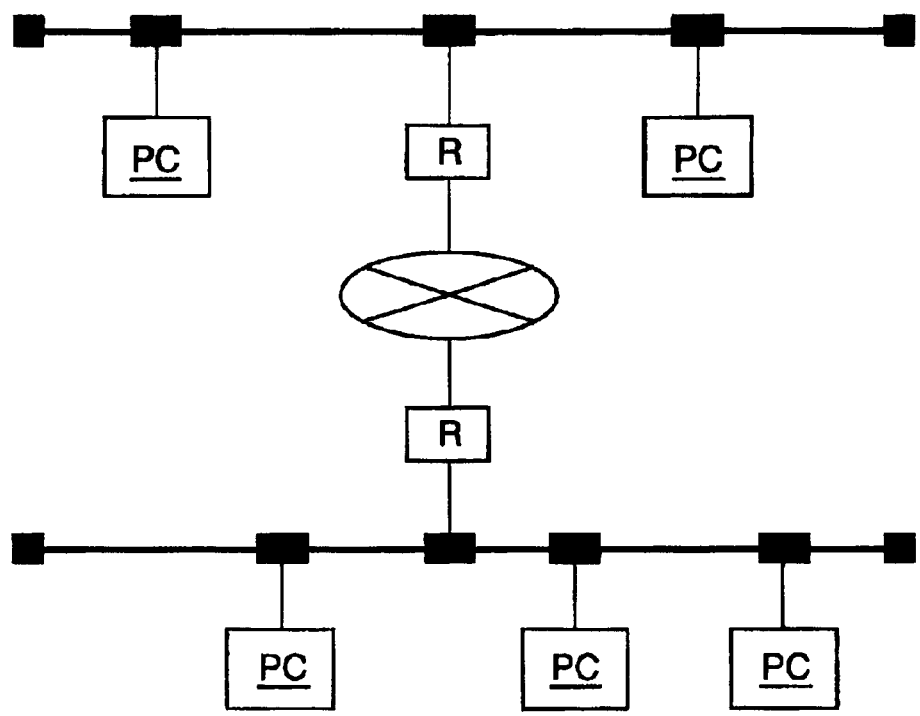
FIG. 3 illustrates an example of a network architecture to which a distributed database-management system according to an embodiment of the present invention is applied.

FIG. 3 illustrates an example of a network architecture to which the present system is applied.

Shown here is a conceptual network in which two LANs are connected to each other by LAN via routers R, with several personal computers PC connected to each LAN. A network to which the present system is applied can be freely modified in which WAN is not necessarily provided and any type of severs can be provided in each LAN.

Figure 4:
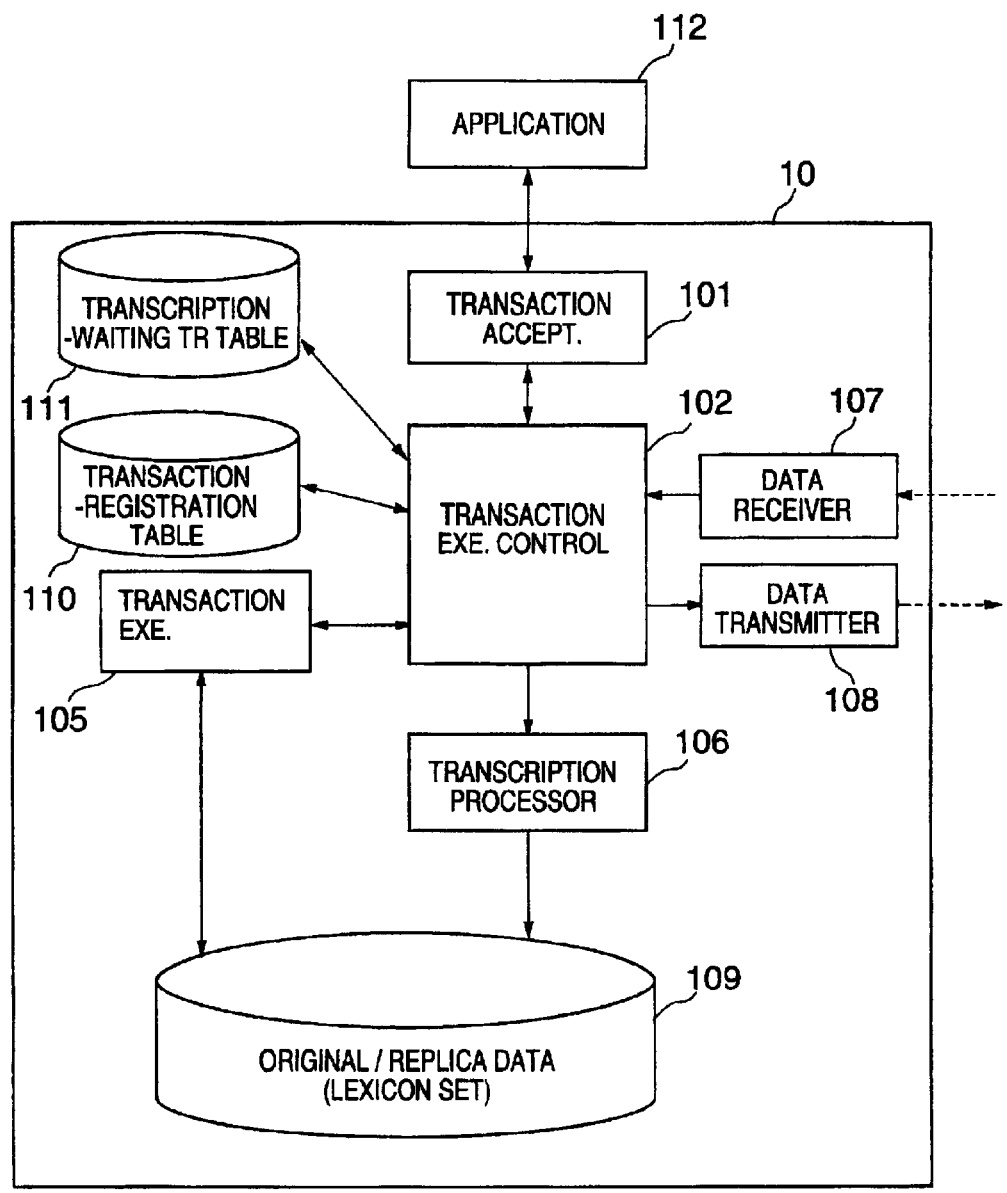
FIG. 4 shows a functional block diagram of a distributed data-management apparatus as the first embodiment of the present invention.

FIG. 4 shows a functional block diagram of a distributed data-management apparatus 10 as the first embodiment of the present invention provided in each machine for achieving the function "transcription". The distributed data-management apparatus 10 shown in FIG. 4 corresponds to each of the processor 3a, 3b and 3c shown in FIG. 1 and disclosed in [Overall Picture of Distributed Data-Management System].

The distributed data-management apparatus 10 is equipped with a transaction-accepting section 101 for accepting a transaction-execution request from an application 112; a transaction-execution controller 102 for controlling execution of a transaction at a self-site; a transaction-executing section 105 for calling a transaction function used for executing a transaction and executing the transaction; a "transcription" processor 106 for making data at a self-site to reflect changes in "transcribed" data (disclosed later); a data receiver 107 and a data transmitter 108.

The transaction-accepting section 101 issues a reception ID whenever accepting a transaction-execution request. The reception ID consists of a pair of a reception machine and a reception serial number. Each Transaction is identified with the reception ID as to which site has accepted this transaction at what number.

The data transmitter 108 performs transmission of a remote TR (disclosed later) to an original site and data to other sites with the function of "transcription". The data receiver 107 receives remote TRs from replica sites and "transcribed" data from other sites with the function of "transcription".

Moreover, the distributed data-management apparatus 10 is equipped with a data storage 109 for storing lexicon sets of original or replica data; a transaction-registration table 110 (FIG. 5) which is a list of transaction names, lexicon-set names to be processed by the transactions, original (ORG)-site names for the lexicon sets, attributes (looking-up/updating) of the transactions, and transaction-function names corresponding to the transactions; and a "transcription"-waiting TR table 111 (FIG. 6) used at a self-site when it is a replica site.

The following procedures are performed when the application 112 makes a transaction-execution request to any host provided with the distributed data-management apparatus 10.

[4-2. Operation of First Embodiment]

Transactions that will run on the present system are classified into two procedures "looking-up" for data looking-up only and "updating" in which data is updated. Hosts for executing transactions are classified into two types "local site . . . self-site" and "remote site . . . other sites".

All hosts hold the identical data in their main-memory areas in the present invention. However, the hosts are classified into a site (original site) holding original data and another site (replica site) holding the replica (copy) of the original data. Data updating by executing the transaction is allowed only for the original site holding original data. The updated data portion is transmitted to all replica sites by the function "transcription" so that all hosts can handle the identical data.

The procedure "looking-up" is only for data looking-up, updating being prohibited. All sites can perform this procedure regardless of whether data resident at the sites are original or replica data.

Disclosed in detail with reference to FIGS. 7 to 12 are the transactions explained above.

(1) Local looking-up procedure

Figure 7:
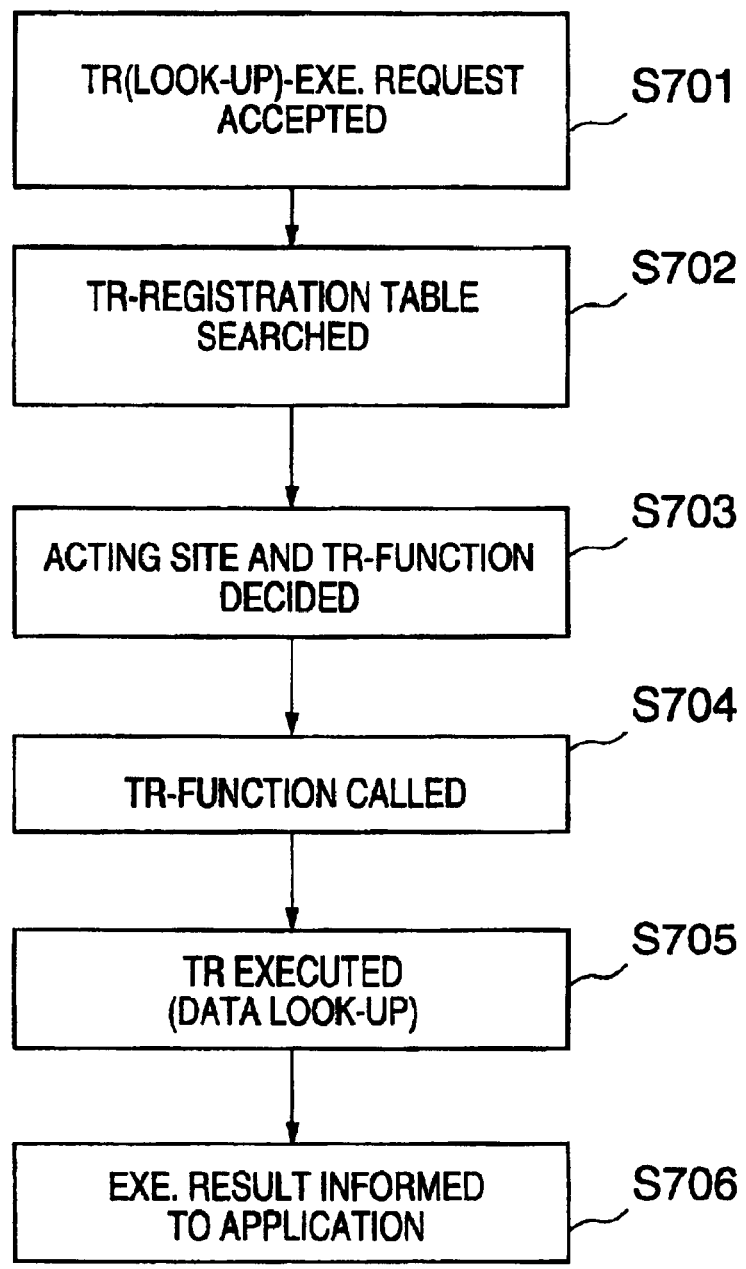
FIG. 7 is a flowchart showing a local looking-up procedure.

The local looking-up procedure is executed in the order of steps shown in FIG. 7.

On receiving a request for executing a data looking-up TR from the application 112 (S701), the transaction-accepting section 101 issues a reception ID. In response to the request, the transaction-execution controller 102 searches the transaction-registration table 110 shown in FIG. 5 (S702), to decide a site to execute the data looking-up TR and also a transaction function required for executing this transaction (S703). As instructed by the controller 102, the transaction-executing section 105 calls the transaction function (S704) and executes the transaction, the data looking-up procedure using the transaction function (S705). After the data looking-up procedure has been completed, the controller 102 informs the application 112 of the executed results (S706).

(2) Local updating procedure

All hosts hold the identical data in their main-memory areas in the present invention. However, there are only one original site holding original data and replica sites holding the replica (copy) of the original data in a network. The data-updating procedure is allowed only for the original site holding the original data.

The local updating procedure disclosed below is performed when a self-site (local site) that has accepted a transaction-execution request is the original site.

Figure 8:
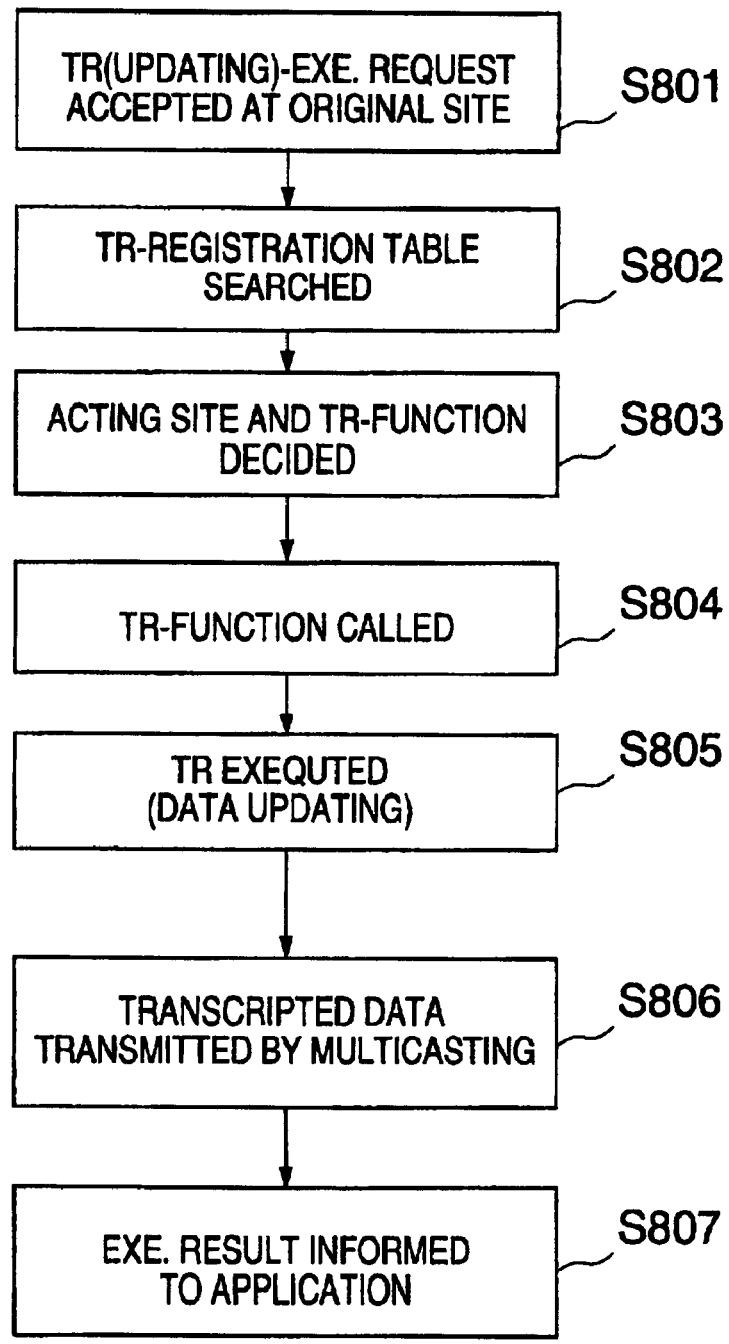
FIG. 8 is a flowchart showing a local updating procedure.

As shown in FIG. 8, on receiving a request for executing a data updating TR from the application 112 (S801), the transaction-accepting section 101 issues a reception ID. On the request, the transaction-execution controller 102 searches the transaction-registration table 110 shown in FIG. 5 (S802), to determines whether the self-site is the original site to be allowed to execute the data-updating TR and decide a transaction function required for executing this transaction (S803). As instructed by the controller 102, the transaction-executing section 105 calls the transaction function (S804) and executes the data updating procedure using the transaction function (S805).

After the data updating procedure has been completed by the transaction-executing section 105 at the self-site, the updated data is transmitted from the data transmitter 108 to replica sites by multicasting with the function "transcription" (S807). The transaction-execution controller 102 informs the application 112 (that has made the request) of the executed results (S808).

At each replica site that has received the updated data via the data receiver 107, the updated data is sent to the transaction-execution controller 102. The controller 102 instructs the "transcription" processor 106 to make the replica data to reflect the updating so that the replica data can match the updated original data. This procedure achieves a quick recovery of data resident at all hosts from data mis-matching due to the local updating procedure so that all hosts can hold the identical data in their main-memory areas all time.

(3) Remote updating procedure

When a self-site that has accepted an updating TR is a replica site, it is not allowed to update its data because the data is replica data. The self-site then transmits the updating TR to an original site for data updating. The data updated at the original site is transmitted to the self-site by the function "transcription".

The remote updating procedure depends on whether the self-site is the original or replica site. In detail, the procedure is classified into the first remote updating procedure, the second remote updating procedure and the third remote updating procedure.

The first remote updating procedure is performed at a self-site that is a replica site at which an application program exists. The self-site accepts a data-updating TR from the application program and executes the transaction.

The second remote updating procedure is performed at a self-site that is the original site when it receives a request for original-data updating from another replica site that has received a request for executing this transaction from its application program.

The third remote updating procedure is performed at a self-site that is a replica site with no request for the data-updating procedure (execution of the transaction).

(3-1) First remote updating procedure

A self-site that is a replica site at which an application program exists and that has accepted the data-updating TR from the application program is not allowed to update its data by itself because it is replica data. The self-site requests the original site to update original data and then transmits "transcription" data by multi-casting so that its replica data can reflect the updating.

Figure 9:
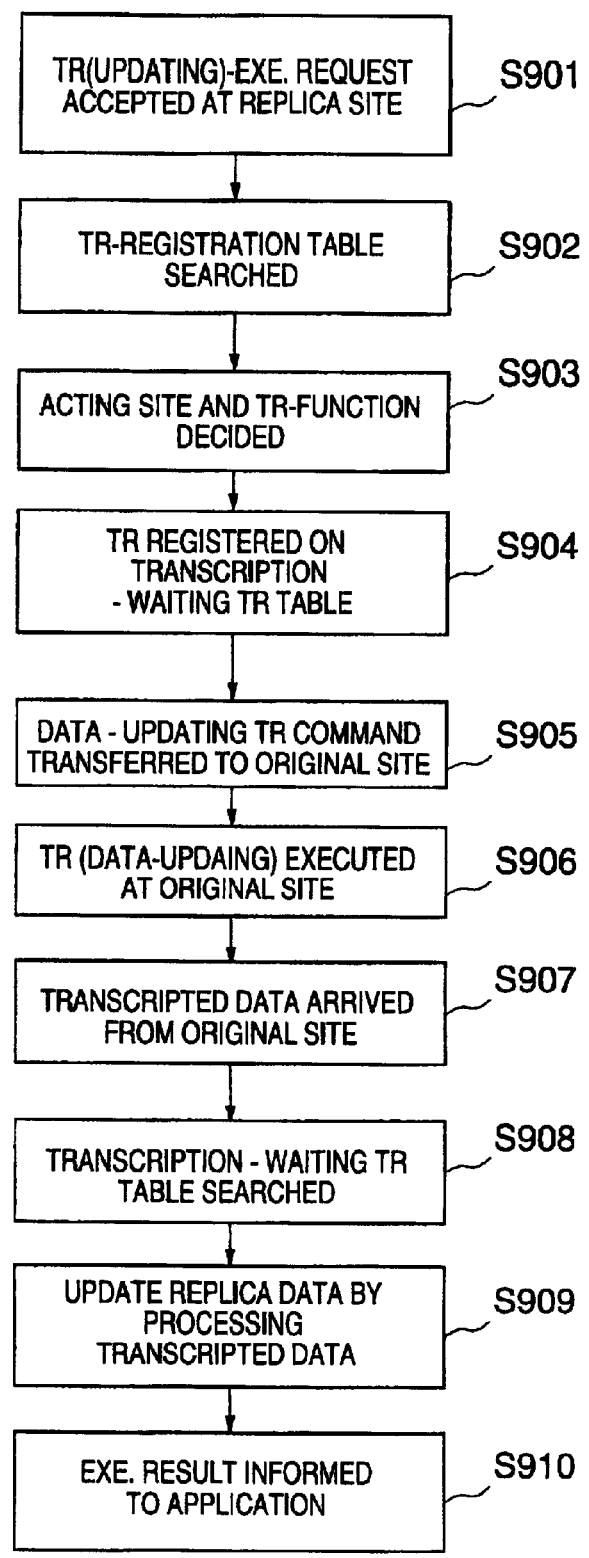
FIG. 9 is a flowchart showing a first remote updating procedure at a replica site having an application program.

In detail, as shown in FIG. 9, on receiving a request for executing the data-updating TR from the application 112 (S901), the transaction-accepting section 101 at the self (replica)-site issues a reception ID. In response to the request, the transaction-execution controller 102 searches the transaction-registration table 110 shown in FIG. 5 (S902), to decide the original site to be allowed to execute this data-updating TR and also a transaction function required for executing this transaction (S903). The controller 102 registers the transaction on the "transcription"-waiting TR table 111 shown in FIG. 6 (S904) and further transfers a command for this data-updating TR to the original site decided on the table 110 via the data transmitter 108 (S905).

The data-updating TR runs at the original site like disclosed in (2) local updating procedure. The updated data is transmitted to the self(replica)-site and other replica sites (S906). The self(replica)-site receives the updated data from the original site (S907) and searches for a target transaction on the "transcription" -waiting TR table 111 using the reception ID (S908). The data updating is performed under the transaction so that the replica data resident at the self (replica)-site can reflect changes in the "transcribed" data due to updating on original data. This data-updating procedure is performed such that the "transcription" processor 106 rewrites a portion (a difference between the replica data and the updated original data) or all of the replica data with the updated data received by the data receiver 107.

After the data-updating procedure has been completed by the "transcription" processor 106, the transaction-execution controller 102 informs the application 112 (that has made the updating request) of the executed results (S910).

(3-2) Second remote updating

When a self-site is the original site and it receives a request for original-data updating from another replica site that has received a request for executing this transaction from its application program, the self-site performs the original-data updating and transmits the updated data to all of the other sites with the function "transcription".

Figure 10:
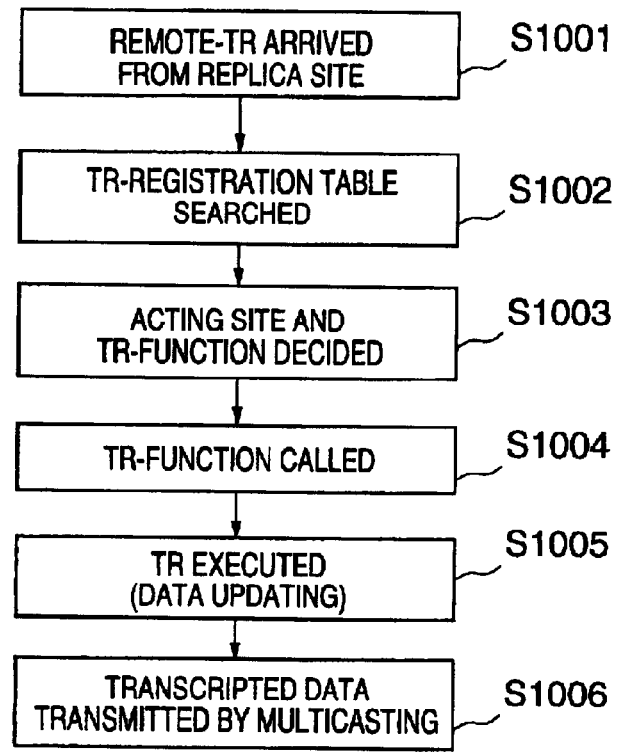
FIG. 10 is a flowchart showing a second remote updating procedure at an original site that has accepted a remote-transaction request.

As shown in FIG. 10, when the original site holding the original data to be updated receives the data-updating TR transferred from the replica site at the data receiver 107

(S1001), the transaction-execution controller 102 searches the transaction-registration table 110 shown in FIG. 5 (S1002), to determines whether the self-site is the original site to be allowed to execute the data-updating TR and, if so, decide a transaction function required for executing this transaction (S1003).

The transaction-executing section 105 calls the selected transaction function (S1004) and executes the updating procedure to the original data using the transaction function (S1005).

After the updating procedure to the original data has been completed, all updated data are transmitted from the data transmitter 108 to replica sites by multicasting with the function of "transcription" (S1006).

(3-3) Third remote updating

A data-updating procedure at a replica site at which no application program exists, or a data-updating procedure at a self-site that is a replica site that has not received a transaction request is the procedure for receiving "transcribed" data from an original site and making replica data resident at the self-site to reflect the updating procedure performed to the original data at the original site.

Figure 11:
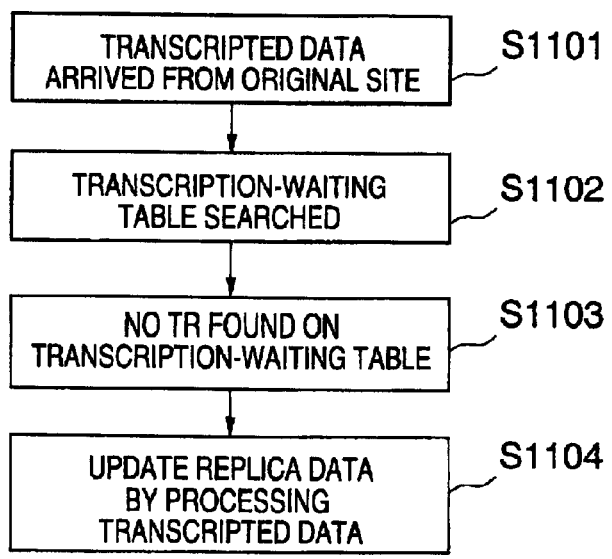
FIG. 11 is a flowchart showing a third remote updating procedure at a replica site with no application program.

In detail, as shown in FIG. 11, when the data receiver 107 has received the "transcribed" data sent from the original site, at the self(replica)-site (S1101), the transaction-execution controller 102 searches the "transcription"-waiting TR table 111 shown in FIG. 6 using a reception ID carried by the function "transcription" (S1102). No transactions are found on the table 111 because the self(replica)-site has not received the request for data-updating procedure (S1103). The controller 102 then instructs the "transcription" processor 106 to make the replica data to reflect the contents of the "transcribed" data (S1104). This results in that the replica data resident at all replica sites become identical to the data at the original site.

(3-4) Flowchart for entire operation

Disclosed above are the procedures (transactions) for the data looking-up TR and the data-updating TR at an original or a replica site. Disclosed next with reference to FIG. 12 is how each transaction is identified and executed at each site.

Figure 12:
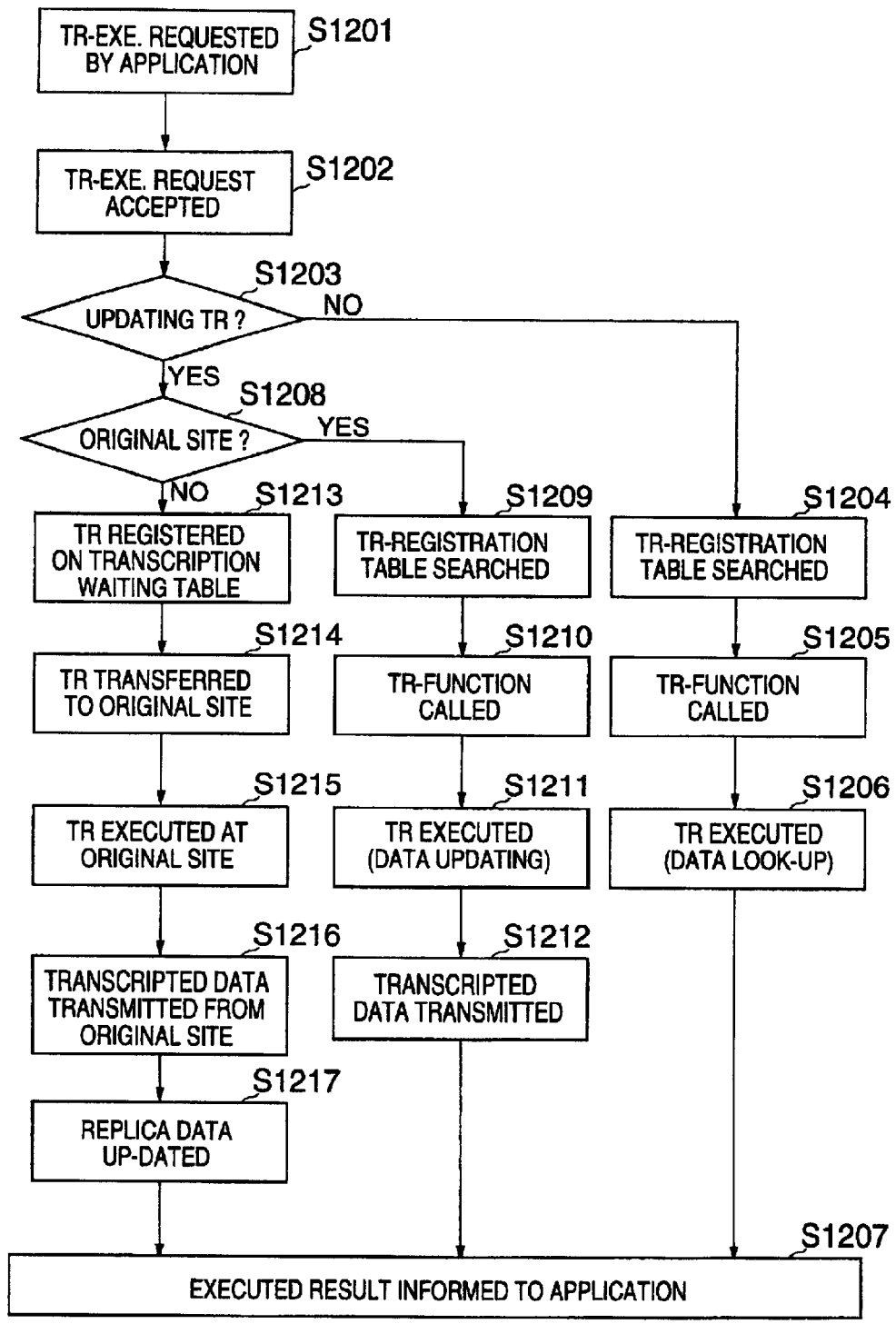
FIG. 12 is a flowchart showing the overall transaction-execution procedures.

As shown in FIG. 12, a self-site receives a transaction-execution request from the application program 112 regardless of whether it is an original or a replica site (S1201).

The transaction-accepting section 101 accepts the request (S1202) and issues a reception ID. The transaction-execution controller 102 determines whether or not the requested transaction is a data-updating TR (S1203). If not, or if it is a looking-up TR (NO in S1203), the controller 102 searches the transaction-registration table 110 (FIG. 5) to determine whether it is the transaction executable at the self-site and also find out a transaction function required for executing the transaction (S1204).

In accordance with the results of searching, the transaction-execution controller 102 calls the transaction function required for executing the looking-up TR (S1205) and executes the looking-up TR using the transaction function (S1206). The controller 102 then informs the application program 112 of the executed results (S1207).

Next, when the accepted transaction is the data-updating TR (YES in S1203), the transaction-execution controller 102 determines whether the self-site that has accepted the data-updating TR is an original site (S1208). if the self-site is the original site (YES in S1208), the controller 102 searches the transaction-registration table 110 (FIG. 5) to find out a transaction function required for executing the data-updating TR at the original site (S1209) and calls the transaction function (S1210).

The transaction-execution controller 102 performs the original data-updating procedure using the transaction function (S1211). The controller 102 transmits the updated results to replica sites by multicasting (S1212) and also informs the updating-requesting application program 112 of the executed results (S1207).

On the contrary, when the self-site that has accepted the data-updating TR is not an original site, or it is a replica site (NO in S1208), the transaction-execution controller 102 registers the accepted transaction on the "transcription"-waiting table 111 shown in FIG. 6 (S1213) and transfers the data-updating TR to another site that is the original site for updating of its own original data (S1214). The original site then executes the data-updating TR in the same way as the procedure in which it executes the same TR requested by its application program 112 (S1215).

On completion of the data-updating TR at the original site, the updated data is transmitted as "transcribed" data from the original site to several replica sites including the self(replica)-site that has originally accepted the data-updating TR (S1216). It is determined at the self(replica)-site that the "transcribed" data corresponds to the results of updating transaction requested by its application program 112, so that the replica-data portion is updated by the "transcribed" data (S1217). The updated results are informed to the application program 112 that has originally accepted the updating transaction.

(3-5) EXAMPLE

The procedures disclosed above are explained with an example in which a site A transmits a remote updating TR to a site B.

(1) On accepting a transaction from an application 112, the site A issues a reception ID (A, 10). The transaction (a remote updating TR) and the reception ID (A, 10) are registered on the "transcription"-waiting TR table 111 (FIG. 6).

(2) The remote TR is transferred to an original site.

(3) The site B that is the original site receives the remote TR. The site B issues an updating ID (A, 10, 99) to a "transcription" log when the transaction is 99-th updating (for example) to its original lexicon sets. The "transcription" log ((A, 10, 99) and updated data are transmitted to several sites by multicasting.

(4) On receiving the "transcription" log ((A, 10, 99) and the updated data at the site A, the "transcription"-waiting TR table 111 is searched with the head (A, 10) as a key to find out the registered transaction. Replica data resident at the site A is processed to reflect the contents of the ("transcribed") data. The completion of updating is informed to the application 112.

[4-3. Advantages in First Embodiment]

The followings are several advantages of the first embodiment disclose above.

(1) Several sites at which the identical common data are resident are classified into original and replica sites, thus achieving data-updating consistency over the several sites.

(2) Data looking-up or updating is stated in registration of transactions before executed, thus achieving high-speed accessing to common data with no network I/O particularly in data looking-up. It is avoided that many transaction procedures are requested to an original site, thus achieving that several sties share loads of procedures.

Data to be stored in DBMS (Data-Management System) are mostly divided into a lot of data to be rarely updated and few data to be often updated. Applying the looking-up TR to the former data offers a high-speed system architecture and achieving that several sties share loads of procedures.

(3) Applications can be offered transaction services (data looking-up/updating) to common data, with no requirements for applications to recognize whether the data is original or replica.

In detail, the present system determines whether the common data is original or replica so that central original-data control like client/server system can be masked against applications. In other words, an application for a site at which the distributed data-management apparatus 10 (the first embodiment) is running does not need to decide an original site for executing an updating TR and also to have communications with this site. Any alterations to the original site require modifications only to a transaction-registration table in the management apparatus 10, not to applications.

(4) Several transaction on remote updating can be accepted concurrently without waiting for the completion of each remote transaction.

In other words, a transaction procedure requested by an application does not need to wait for the completion of a running remote TR requested by another application. This concurrent processing achieves high transaction-procedure efficiency. It is also achieved, for an application that is waiting for the completion of a remote TR, that the remote TR and a local TR look like the same procedure because a transaction on the remote TR terminates at a moment at which replica data has been updated.

In contrast, when an application only for updating, at a self-site, requests directly an original site to execute an updating transaction with means such as a known RPC (remote procedure Call), a moment at which the application receives a transaction-completion notification and another moment at which updating made by the transaction is reflected on replica data at the self-site may not meet with each other. Therefore, a remote TR and a local TR look different from the application on the contents of data resident at the self-site and how a transaction recognized (requested) by the application is proceeded (completed).

On the contrary, the first embodiment achieves a high transaction-procedure throughput with masking the inconsistency of the present system on remote and local TR procedures against applications.

(5) Making replica data to reflect "transcribed" data at replica sites, which are not allowed updating-TR procedures by themselves, requires no updating-TR management (program installation and updating TR execution) at replica sites. Making replica data to reflect the contents of "transcribed" data requires less of amount of calculation compared to execution of the updating TR at replica sites, thus achieving that a drastically less burden of database management (updating) is given to replica sites.

(6) A replica site that has accepted an updating TR informs its application of the completion of the transaction in synchronism with making of replica data to reflect the contents of "transcribed" data. This procedure provides data-access means that is consistent regardless of whether a self-site is an original or a replica site.

[5. Modification]

Disclosed next is a modification to the first embodiment.

The modification offers data (lexicon) peculiar to each machine (host). Such peculiar data resident at each host is not required to be sent to other hosts by the function "transcription" even though it has been updated.

In detail, data (lexicon) peculiar to each host and data that has to be identical over several hosts in a network by the function "transcription" are previously distinguished from each other. For example, the former peculiar data is defined as Multi ORG Lexicon (multi-original data) and the latter Single ORG Lexicon (single original data).

Regardless of whether original or replica sites, an updating procedure can be applied to Multi ORG Lexicon at each machine, updated data being not subjected to the function "transcription" so that it is not transmitted to other sites.

Figure 13:
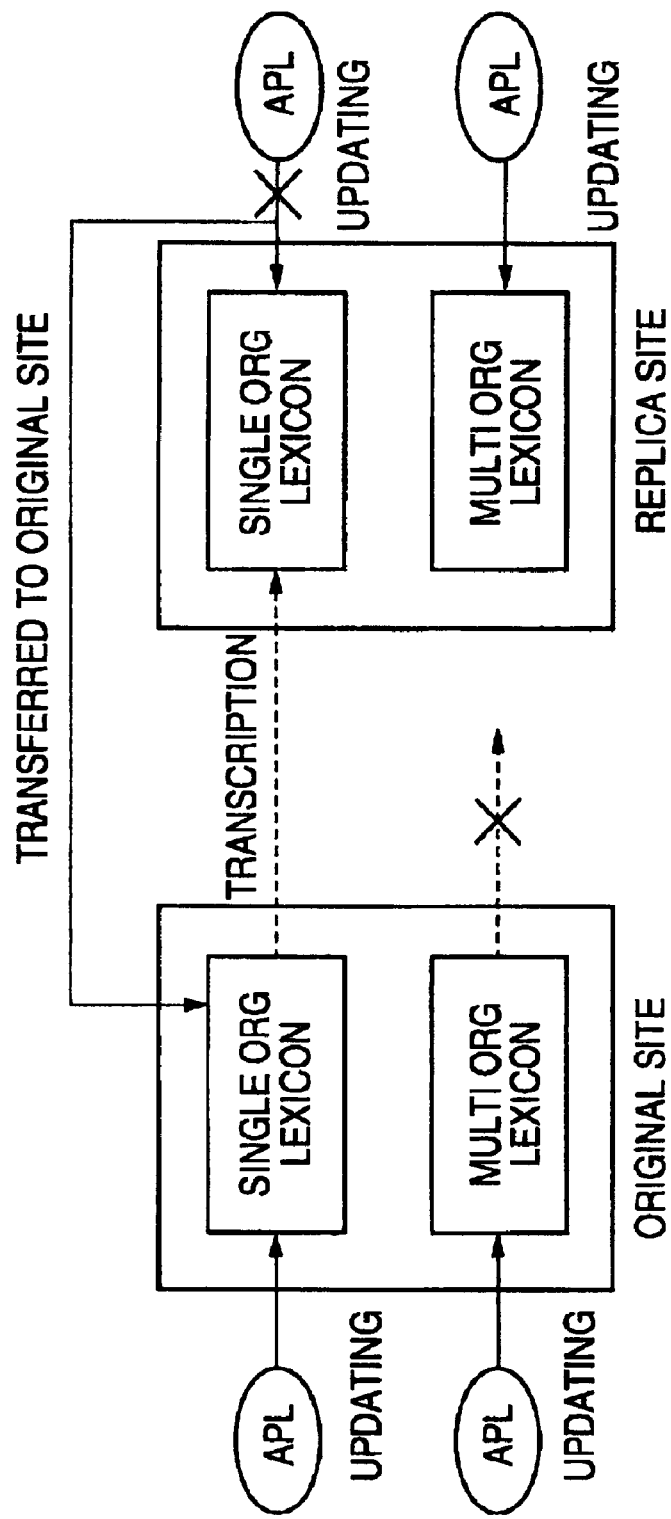
FIG. 13 illustrates an operation of a distributed data-management apparatus according to a modification of the first embodiment of the present invention.

In this modification, when an application program (APL) makes a request for execution of a transaction (updating TR) at a machine, as shown in FIG. 13, the transaction-execution controller 102 (FIG. 4) determines whether a lexicon to be subjected to the transaction is Multi or Single ORG Lexicon. If it is determined as Single ORG Lexicon, the procedures the same as disclosed in the first embodiment are performed, as illustrated on the upper stage of FIG. 13. In contrast, if it is determined as Multi ORG Lexicon, the transaction is executed regardless of whether the self-site is an original or a replica site, the updated results remaining at the self-site without transmitted to other sites by the function "transcription", as illustrated on the lower state of FIG. 13.

As disclosed, the modification achieves updating of data identical over several sites and data peculiar to each site by the same transaction. This is achieved with no generation and transmission of "transcribed" data even though a specific portion (Multi ORG Lexicon) of a database is updated.

Moreover, the modification allows a transaction for updating only multi-original data to be executed at a local (self-) site like a looking-up TR, which authorizes each site to handle data peculiar to each site, thus avoiding unnecessary function "transcription" which would otherwise be performed if this function were a must for all data.

[6. Second Embodiment]

[6-1. "Retriever"]

The function "retriever" is to make original or replica data be used in accordance with pre-settings at the time of system startup.

In a distributed data-management system in this embodiment, a self-site receives a snapshot of the latest data resident at any machine via a network regardless of whether the machine is located at an original or a replica site.

The self-site decides the order of machines from which the latest data is to be offered and requests the machine at the first priority to send the latest data. The self-site requests the machine at the second priority to send the latest data if the data is not sent from the first-priority machine for troubles. If no data being sent from any machine, the machine at which the original data is resident is designated as the final machine from which the data is to be transmitted by the function "retriever". The order of machines from which the latest data is to be offered can be decided in accordance with the locations of original and replica sites, network bandwidth and machine specifications for appropriate system settings.

Database construction with reception of a snapshot of the latest data via a network disclosed above is called "network retriever" for retrieval processing in this invention. The function "network retriever" is performed at a self-site to receive lexicon-set data from another running machine via a network and for starting data-handling.

[6-2. Architecture of Second Embodiment]

FIG. 4 shows a functional block of a distributed data-management apparatus 20 provided at each machine for achieving the function "network retriever" in the second embodiment. The distributed data-management apparatus 20 corresponds to each of the processors 3a, 3b and 3c shown in FIG. 1.

Disclosed below are only two modules installed in the distributed data-management apparatus 20, which are the difference between the apparatus 20 and the counterpart apparatus 10 in the first embodiment shown in FIG. 4.

Figures 14, 15:
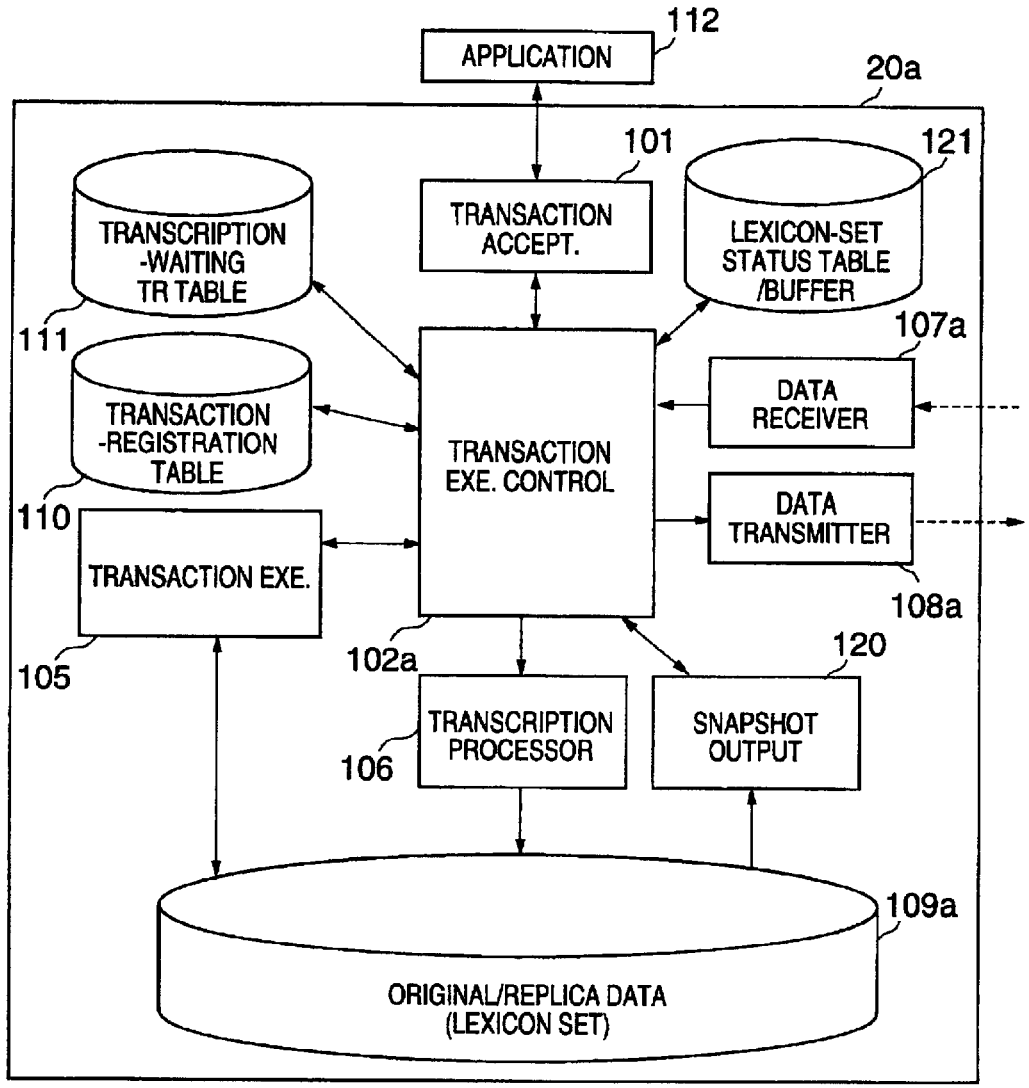
FIG. 14 shows a functional block diagram of a distributed data-management apparatus as the second embodiment of the present invention.
FIG. 15 shows an example of a lexicon-set status table.

The distributed data-management apparatus 20 shown in FIG. 14 is equipped with the two modules, a snapshot output section 120 and a lexicon-set status table/buffer 121, the other sections being identical or analogous to the corresponding sections of the distributed data-management apparatus 4 shown in FIG. 4.

The lexicon-set status table/buffer 121 involves a buffer and a lexicon-set status table shown in FIG. 15 that is the list of ID numbers for lexicon sets to be subjected to the function "network retriever", running status of the lexicon sets and lexicon-set updated numbers.

A data transmitter 108a in this embodiment performs snapshot transmission (disclosed later), snapshot transmission ("network retriever") request to an original site and also data transmission with the function "transcription" to other sites.

A data receiver 107a in this embodiment performs reception of snapshots from the original site and data reception with the function "transcription" from other sites.

The following procedures are proceeded when an application 112 makes a request for performing the function "network retriever" at each host having the distributed data-management apparatus 20.

The term "snapshot" is defined as data required for forming a lexicon set at a specific moment. The lexicon-set updated number (FIG. 15) is issued whenever an updated TR has been executed and thus a lexicon set has been updated. The updated number is the serial number of updating applied to a lexicon set. The updated number thus increases for each execution of updating transaction at an original site, and which increases for each performance of the function "transcription" at replica sites. A lexicon set at the updated number #N is formed from a snapshot at the updated number #N. A "transcription" log at the updated number #N is defined as a difference information (updating record) for obtaining a lexicon set at the updated number #N from another lexicon set at the updated number #N−1.

[6-3. Operation of Second embodiment]

Figure 16:
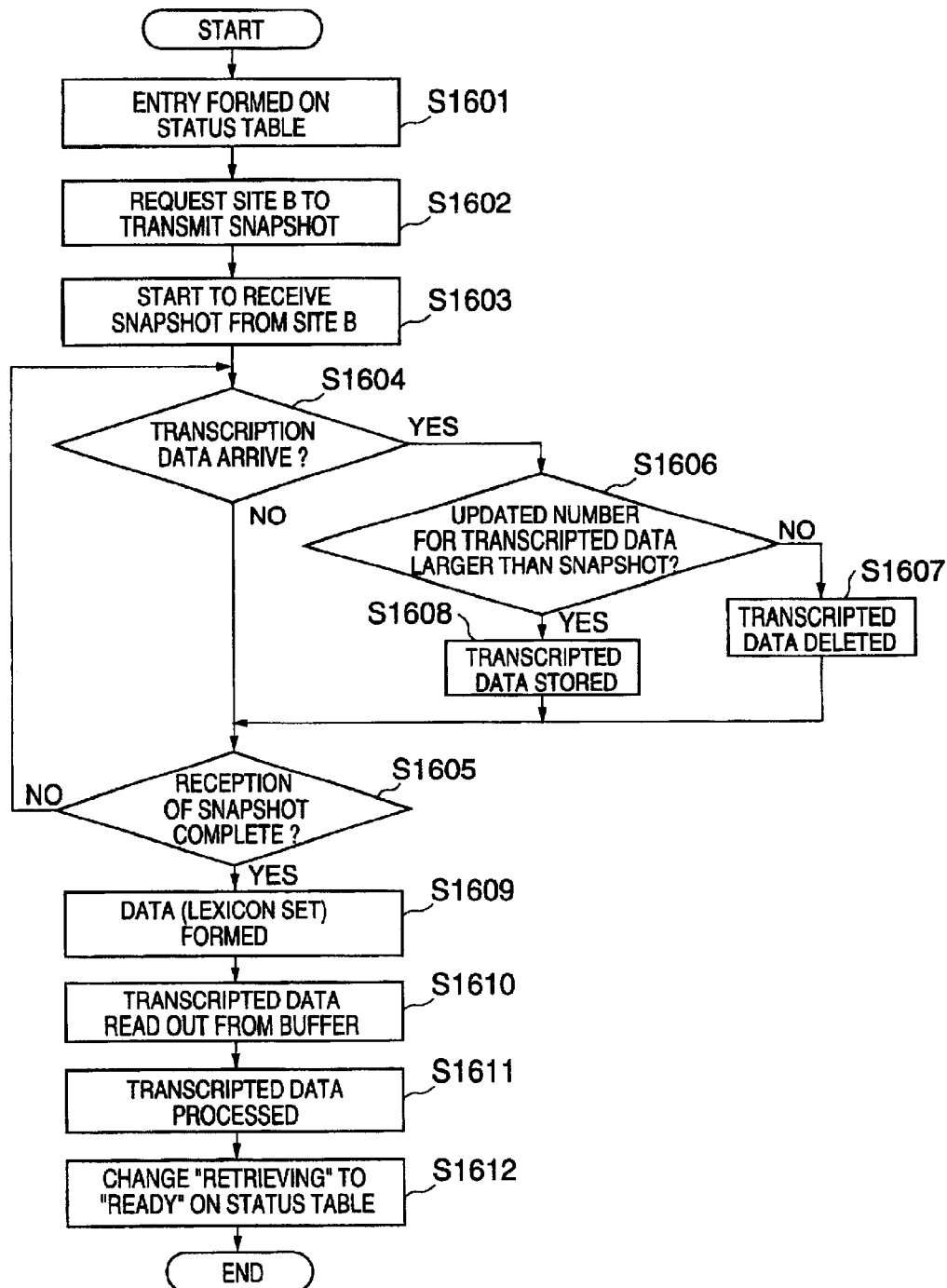
FIG. 16 is a flowchart showing a procedure at a site A (replica site) with the function "network retriever" for retrieval processing.
Figure 17:
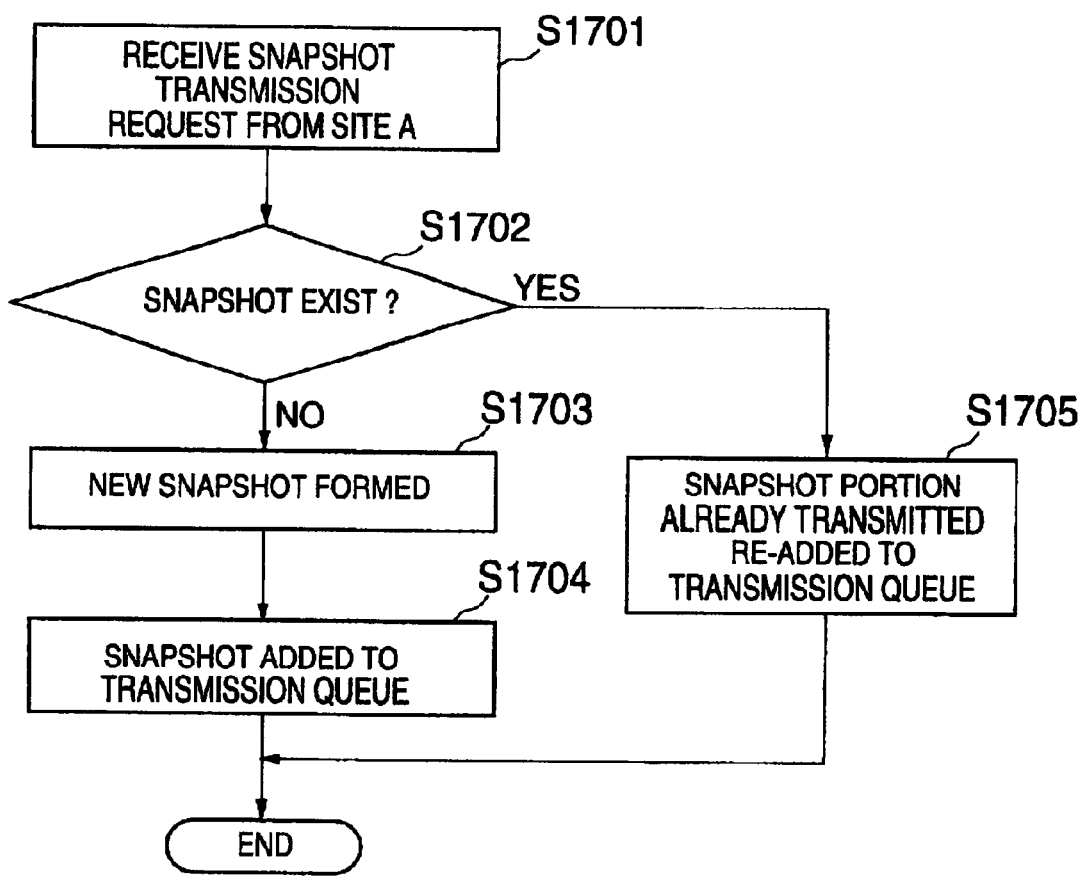
FIG. 17 is a flowchart showing a procedure at a site B (original site) with the function "network retriever".

The function "network retriever" is next disclosed with reference to flowcharts shown in FIGS. 16 and 17. FIGS. 16 and 17 show procedures for executing the function "network retriever" at a site A (replica site) and at a site B (original site), respectively.

(6-3-1) Procedure at site A

In startup at the site A, an entry is formed on the lexicon-set status table shown in FIG. 15, for obtaining a lexicon set by the function "network retriever", in which the lexicon set is stated as "under retriever" (S1601). The site A requests the site B (original site) to transmit a snapshot (S1602). On starting the transmission of the snapshot at the site B in response to the request, the site A starts reception of the snapshot (S1603).

It is determined at the site A whether there is "transcribed" data for the lexicon set corresponding to the snapshot transmitted from the site B (S1604). If there is no "transcribed" data (NO in S1604), it is determined at the site A whether the reception of the snapshot has been completed (S1605). If not completed (NO in S1605), the reception of the snapshot continues and the procedure returns to step S1604 for determination as to whether there is "transcribed" data for the snapshot.

On the contrary, if there is "transcribed" data for the lexicon set corresponding to the snapshot transmitted from the site B (YES in S1604), it is determined at the site A whether an updated number for the "transcribed" data is larger than that for the snapshot (S1606). If the former is equal to or smaller than the latter, or the "transcribed" data is older than the snapshot received now (NO in S1606), the "transcribed" data is deleted (S1607). If the former is larger than the latter (YES in S1606), the "transcribed" data is stored for updating the data in the status of "under retriever".

In other words, when the "transcribed" data transmitted by the function "replicator" is an old version, or older than (the updated number is equal to smaller than) the data in the status of "under retriever", (which is now being transmitted by the function "network retriever"), the "transcribed" data is not necessary and thus deleted.

On the contrary, when the "transcribed" data is a new version, or younger than (the updated number is larger than) the data in the status of "under retriever", the "transcribed" data is necessary and thus stored in the buffer.

On completion of "transcribed" data deletion or storing, the procedure returns to step S1605, to determine whether the snapshot reception has been completed (S1605). If completed (YES in S1605), a lexicon set is formed using the received snapshot (S1609).

The "transcribed" data stored in the buffer in step S1608 is then read out (S1610) and processed (S1611). On completion of data formation, the lexicon set that has been stated as "under retrieving" on the lexicon-set status table shown in FIG. 15 is stated as "ready complete" (S1612), and the procedure ends.

(6-3-2) Procedure at site B receiving snapshot

When the site B (original site) receives the "network retriever" request (S1701) from the site A, it is determined whether the requested snapshot has existed at the site B (S1702). This determination is made because when a site other than the site A had requested the site B to transmit the snapshot by the function "network retriever" and then the snapshot has been formed and resident at the main-memory area of the site B, it can be used for the site A.

If the requested snapshot does not exist at the site B (NO in S1702), a snapshot for main-memory data is newly formed (S1703) and added to a transmission cue (S1704). On the other hand, if it exists (YES in S1702), only a snapshot portion that has already been transmitted is added again to the transmission cue (S1705).

The snapshot added to the transmission queue is transmitted to the site A that has made the "network retriever" request at a specific transmission timing.

(6-3-3) EXAMPLE

Explained next is an example of the snapshot transmission from the site B to the site A with the function "network retriever".

(1) The site A requests the site B to transmit a snapshot.

(2) The site B forms a snapshot with a snapshot number "#47" and transmits it to the site A.

(3) The site A starts receiving the snapshot. During the snapshot reception, the site A could also receive "transcribed" data for new lexicon-updating because it takes long to receive a snapshot. When the "transcribed" data received by the site A has an updated number larger than the snapshot number "#47", it is stored in the buffer at the site.

(4) On completion of the snapshot reception at the site A, "transcription" logs such as "#48", "#49", . . . , have remained in the buffer for "transcribed" data.

A lexicon set at the updated number "#47" is formed based on the snapshot at the snapshot number "#47" and then the stored "transcribed" data at "#48", "#49", . . . , are processed all at once to catch up with the latest lexicon set.

[6-4. Advantages in Second embodiment]

The second embodiment allows provision of a replica database to new site during the performance of the function "transcription" without entire system halt. The second embodiment also allows provision of the replica of the latest original data to each site for dynamic system expansion.

Each site can catch up with ever-changing lexicon sets in the shortest time with the function "network retriever" with no transaction interruption during snapshot transmission.

[Other Modifications]

The followings are several modifications to the embodiments disclosed above.

The several machines are expressed as physically different machines and communications network is expressed as a communications means including physical medium among the machines in the embodiments. The several machines may however be expressed as different procedures (logical machines) in one machine. Each logical machine may be identified with means such as a procedure ID.

Transaction functions are called for execution of transactions in the embodiments. Transactions may however be executed in different ways. For example, each transaction may have a statement of detailed data-operating procedures. The present system then interprets and executes the procedures.

A network via which "transcribed" data are transmitted and that via which transactions are transmitted may be physically/logically same or different from each other. A multi-cast/broadcast network may be efficient for data transmission over several replica sites. It is however not a must in the present invention. One-to-one communications is enough for transaction transmission. However, the multi-cast/broadcast network may also be available under the requirements that transactions received at sites which are not allowed to execute these transactions be deleted or not to be executed.

As disclosed above, the present invention can provide a distributed data-management system and a distributed data-management method, in which several machines in a network co-operate to manage data so that identical data can be resident at main-memory areas over the several machines.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data-management system comprising at least two computers connected via a network, the computers having main-memory areas storing databases, each database having at least a piece of data, either of the computers being designated as an original site for storing the original of the data, the other computer being designated as a replica site for storing replica of the data, each computer including:

a transaction acceptor configured to accept a request for executing a transaction of accessing the database;

a transaction executor configured to execute the transaction;

a replication processor configured to process the replica data to reflect updated data sent from the original site; and a data receiver and a data transmitter, wherein an updating transaction for the data of the database is performed by the transaction executor but allowed only for the original site, and the updated data is transmitted from the data transmitter of the original site and received by the data receiver of the replica site and reflected on the replica data of the replica site by the replication processor.

2. The data-management system according to claim 1, each computer further including:

a snapshot generator configured to generate a snapshot of the data; and a buffer configured to store information on the data updated during the receipt of the snapshot via the network, wherein a snapshot transmission request is sent to another computer from the data transmitter and the information on the data updated during the receipt of the snapshot from the computer that has accepted the request is stored in the buffer, the stored information being reflected on data of each computer.

3. The data-management system according to claim 1, wherein the transaction acceptor issues identification per receipt of the request for the transaction, the identification being used for identifying the transaction over the computers.

4. The data-management system according to claim 1, wherein the transaction executor issues an updating identifier whenever the updating transaction is performed.

5. The data-management system according to claim 1, each computer further including a recognizer configured to recognize either of the computers as the original site.

6. The data-management system according to claim 1, each computer further including a recognizer configured to recognize as to whether the updating transaction has been requested to the original site.

7. A data-management system comprising at least two computers connected via a network, the computers having main-memory areas storing databases, each database having at least a piece of data, either of the computers being designated as an original site for storing the original of the data, the other computer being designated as a replica site for storing replica of the data, each computer including:

a transaction acceptor configured to accept a request for executing a transaction of accessing the database;

a transaction executor configured to execute the transaction;

a replication processor configured to process the replica data to reflect updated data sent from the original site; and a data receiver and a data transmitter;

wherein an updating transaction for the data of the database is performed by the transaction executor but allowed only for the original site, and the updated data is transmitted from the data transmitter of the original site and received by the data receiver of the replica site and reflected on the replica data of the replica site by the replication processing section.

wherein data to be given to each database are classified into first data to be identical over the computers and second data peculiar to each computer, an updating transaction for the first data is performed by the transaction executor but allowed only for the original site, information on the updating transaction performed at the original site being received by the data receiver of the replica site and reflected on the replica data by the replication processor and an updating transaction for the second data is performed at each computer.

8. A data-management method for managing databases provided for at least two computers connected via a network, the computers having main-memory areas storing databases, each database having at least a piece of data, the method comprising:

designating either of the computers as an original site for storing an original of the data;

designating the other computer as a replica site for storing replica of the data;

performing a transaction of accessing the database at each computer;

determining which one of the computers is the original site, the determining being performed by each computer;

updating the data of the database at the original site, the updating being allowed only for the original site; and reflecting the data thus updated at the original site on the replica data of the replica site to maintain data equivalence over the databases.

9. The data-management method according to claim 8 further comprising:

sending a snapshot transmission request to a first computer via the network for receiving the latest data at a second computer;

receiving a snapshot sent from the first computer and storing information on data updated during the receipt of the snapshot; and reflecting the stored information on the updated data on data of the second computer to catch up with the updated data immediately after the receipt of the snapshot.

10. The data-management method according to claim 8 further comprising, when the transaction is data looking up, performing the data looking-up transaction regardless of whether each computer is the original or the replica site.

11. The data-management method according to claim 8, wherein when the data of the original site has been updated by the transaction on request, information on the updating is transmitted to the replica site.

12. The data-management method according to claim 8, wherein when the original site is not a computer that has accepted a request for the transaction of data updating, further comprising:

requesting the original site to update the data, the request being made from the computer that has accepted the request;

receiving information on the updating at the computer that has accepted the request on completion of updating at the original site; and reflecting the information on the updating on the replica data of the computer that has accepted the request and informing the client application that has made the request for the transaction of data updating.

13. The data-management method according to claim 8, wherein when the original site is not a computer that has accepted a request for the transaction of data updating, further comprising, transmitting information on the updating to the replica site from the original site on completion of updating at the original site.

14. The data-management method according to claim 8, wherein when the original site is not a first computer that has accepted a request for the transaction of data updating, further comprising:

receiving information on the updating at a second computer that is not the original site nor the first computer from the original site; and reflecting the information on the updating on the replica data of the second computer.

15. A data-management method for managing databases provided for at least two computers connected via a network, the computers having main-memory areas storing databases, each database having at least a piece of data, the method comprising:

designating either of the computers as an original site for storing the original of the data;

designating the other computer as a replica site for storing a replica of the data;

performing a transaction of accessing the database at each computer;

determining which one of the computers is the original site, the determining being performed by each computer;

updating the data of the database at the original site, the updating being allowed only for the original site; and reflecting the data thus updated at the original site on the replica data of the replica site to maintain data equivalence over the databases:

classifying data to be given to each database into first data to be identical over the computers and second data peculiar to each computer;

performing an updating transaction for the first data at the original site only; and reflecting information about the updating performed at the original site on the replica data at the replica site to maintain data equivalence over the computers and updating the second data at each computer.

16. A computer readable medium containing a data-management program for managing databases provided for at least two computers connected via a network, the computers having main-memory areas storing databases, each database having at least a piece of data, the program having instructions for:

designating either of the computers as an original site for storing the original of the data;

designating the other computer as a replica site for storing a replica of the data;

performing a transaction of accessing the database at each computer;

determining which one of the computers is the original site, the determining being performed by each computer;

updating the data of the database at the original site, the updating being allowed only for the original site; and reflecting the data thus updated at the original site on the replica data of the replica site to maintain data equivalence over the databases.

17. The computer readable medium according to claim 16, the program further having instructions for:
  sending a snapshot transmission request to a first computer via the network for receiving most recent data at a second computer;
  receiving a snapshot sent from the first computer and storing information on data updated during the receipt of the snapshot; and
  reflecting the stored information on the updated data on data of the second computer to catch up with the updated data immediately after the receipt of the snapshot.

18. The computer readable medium according to claim 16, the program further having an instruction for performing a data looking-up transaction regardless of whether each computer is the original or the replica site.

19. The computer readable medium according to claim 16, when the data of the original site has been updated by the transaction on request, the program further having an instruction for transmitting information on the updating to the replica site.

20. The computer readable medium according to claim 16, when the original site is not a computer that has accepted a request for the transaction of data updating, the program further having instructions for:
  requesting the original site to update the data, the request being made from the computer that has accepted the request;
  receiving information on the updating at the computer that has accepted the request on completion of updating; and
  reflecting the information on the updating on the replica data of the computer that has accepted the request and informing the client application that has made the request for the transaction of data updating.

21. The computer readable medium according to claim 16, when the original site is not a computer that has accepted a request for the transaction of data updating, the program further having an instruction for transmitting information on the updating to the replica site from the original site on completion of updating.

22. The computer readable medium according to claim 16, when the original site is not a first computer that has accepted a request for the transaction of data updating, the program further having instructions for:
  receiving information on the updating at a second computer that is not the original site nor the first computer from the original site; and
  reflecting the information on the updating on the replica data of the second computer.

23. A computer readable medium containing a data-management program for managing databases provided for at least two computers connected via a network, the computers having main-memory areas storing databases, each database having at least a piece of data, the program having instructions for:
  designating either of the computers as an original site for storing the original of the data;
  designating the other computer as a replica site for storing a replica of the data;
  performing a transaction of accessing the database at each computer;
  determining which one of the computers is the original site, the determining being performed by each computer;
  updating the data of the database at the original site, the updating being allowed only for the original site; and
  reflecting the data thus updated at the original site on the replica data of the replica site to maintain data equivalence over the databases;
  classifying data to be given to each database into first data to be identical over the computers and second data peculiar to each computer;
  performing an updating transaction for the first data at the original site only; and
  reflecting information about the updating performed at the original site on the replica data at the replica site to maintain data equivalence over the computers and updating the second data at each computer.

24. A computer readable medium containing a data-management program for managing data for at least two computers connected via a network for data management, the computers having main-memory areas storing databases, each database having at least a piece of data, either of the computers being designated as an original site for storing the original of the data, the other computer being designated as a replica site for storing a replica of the data, information on data updating performed at the original site being reflected on the replica site to maintain data equivalence over the computers, the program having instructions for:
  determining which of the computers is the original site for storing the original of the data and whether a transaction for the data is a looking-up transaction or an updating transaction;
  performing the updating transaction when it is determined that the computer for performing the transaction is the original site and the transaction for the data is the updating transaction; and
  transmitting information on the updating transaction to the replica site.

25. A computer readable medium containing a data-management program for managing data for at least two computers connected via a network for data management, the computers having main-memory areas storing databases, each database having at least a piece of data, either of the computers being designated as an original site for storing the original of the data, the other computer being designated as a replica site for storing a replica of the data, information on data updating performed at the original site being reflected on the replica site to maintain data equivalence over the computers, the program having instructions for:
  determining which of the computers is the original site for storing the original of the data and whether a transaction for the data is a looking-up transaction or an updating transaction;
  transmitting the updating transaction to the original site when it is determined that the computer for performing the transaction is the replica site and the transaction for the data is the updating transaction; and
  receiving information on the updating transaction performed at the original site and reflecting the information on the replica data at the replica site.

26. The computer readable medium according to claim 25, the program further having instructions for:
  sending a snapshot transmission request to a first computer via the network for receiving the latest data at a second computer;
  receiving a snapshot sent from the first computer and storing information on data updated during the receipt of the snapshot; and
  reflecting the stored information about the updated data on data of the second computer to catch up with the updated data immediately after the receipt of the snapshot.

* * * * *